(12) United States Patent  (10) Patent No.: US 6,494,105 B1
Gallagher  (45) Date of Patent: Dec. 17, 2002

(54) METHOD FOR DETERMINING FLOW VELOCITY IN A CHANNEL

(76) Inventor: James E. Gallagher, P.O. Box 6387, Kingwood, TX (US) 77325-6387

( * ) Notice: Subject to any disclaimer, the term of this patent is extended or adjusted under 35 U.S.C. 154(b) by 0 days.

(21) Appl. No.: 09/306,769

(22) Filed: May 7, 1999

(51) Int. Cl.$^7$ ................................................. G01F 1/66
(52) U.S. Cl. ................................................. 73/861.27
(58) Field of Search ...................... 73/861.28, 861.357, 73/204.27, 861.31, 861.27; 123/417, 416; 364/508

(56) References Cited

U.S. PATENT DOCUMENTS

| | | | |
|---|---|---|---|
| 1,473,349 A | 11/1923 | Kach | |
| 1,759,239 A | 5/1930 | Morrison | |
| 2,688,985 A | 9/1954 | Holdenried | 138/44 X |
| 2,927,462 A | 3/1960 | Li | |
| 2,929,248 A | 3/1960 | Sprenkle | 73/198 |
| 3,191,630 A | 6/1965 | Demyan | 138/42 |
| 3,250,469 A | 5/1966 | Colston | 73/861.52 |
| 3,564,912 A | 2/1971 | Malone et al. | |
| 3,572,391 A | 3/1971 | Hirsch | 138/40 |
| 3,733,898 A | 5/1973 | Yamamoto et al. | 73/198 |
| 3,838,598 A | 10/1974 | Tompkins | 73/205 L |
| 3,840,051 A | 10/1974 | Akashi et al. | 138/37 |
| 3,940,985 A | 3/1976 | Wyler | 73/194 A |
| 3,964,519 A | 6/1976 | De Baun | 138/37 |
| 4,130,173 A | 12/1978 | Cooksey | 181/212 |
| 4,140,012 A * | 2/1979 | Hendricks | 73/194 |
| 4,142,413 A | 3/1979 | Bellinga | 73/198 |
| 4,280,360 A | 7/1981 | Kobayashi et al. | 73/198 |
| 4,317,178 A | 2/1982 | Head | 364/510 |
| 4,509,371 A | 4/1985 | Wellman | 73/861 |
| 4,522,077 A | 6/1985 | Köberle | 73/861.63 |
| 4,523,478 A * | 6/1985 | Zacharias, Jr. | 73/861.27 |
| 4,528,847 A | 7/1985 | Halmi | 73/195 |
| 4,646,575 A * | 3/1987 | O'Hair et al. | 73/861.31 |
| 4,649,760 A | 3/1987 | Wedding | 73/863.23 |
| 4,974,452 A | 12/1990 | Hunt et al. | 73/861.64 |
| 5,213,080 A * | 5/1993 | Lambert et al. | 123/417 |
| 5,255,716 A | 10/1993 | Wilcox | 138/44 |
| 5,341,848 A | 8/1994 | Laws | 138/44 |
| 5,392,815 A | 2/1995 | Stuart | 138/37 |
| 5,495,872 A | 3/1996 | Gallagher et al. | 138/44 |
| 5,521,840 A * | 5/1996 | Bednar | 364/508 |
| 5,529,093 A | 6/1996 | Gallagher et al. | 138/44 |
| 5,546,812 A | 8/1996 | Drenthen | 73/861.29 |
| 5,861,561 A | 1/1999 | Van Cleve et al. | 73/861.52 |
| 6,053,054 A * | 4/2000 | Wusterbarth et al. | 73/861.28 |

FOREIGN PATENT DOCUMENTS

| | | |
|---|---|---|
| DE | 224528 | 8/1922 |
| FR | 0034079 | 1/1981 |
| JP | 5754705 | 1/1982 |
| JP | 57-190106 | 11/1982 |
| NO | 55970 | 12/1935 |
| SU | 901680 | 1/1979 |
| WO | WO9101452 | 2/1991 |

* cited by examiner

Primary Examiner—Benjamin R. Fuller
Assistant Examiner—Jewel V. Thompson
(74) Attorney, Agent, or Firm—Fulbright & Jaworski L.L.P.

(57) ABSTRACT

A method for measuring fluid flow are disclosed. The invention combines isolating flow conditioner technology with ultrasonic technology to determine flow velocity. The method and apparatus of the invention does not require the use of integration techniques or the prior determination of flow swirl or asymmetry to achieve accuracy. The performance of this novel flowmeter exceeds the performance of current ultrasonic flowmeters by an order of four to twelve times and offers significant savings in manufacturing and maintenance costs. The disclosed flowmeter also has self-diagnostic capabilities.

28 Claims, 14 Drawing Sheets

PATH "A"

PATH "B"

PATH "C"

METHOD FOR DETERMINING FLOW VELOCITY IN A CHANNEL

BACKGROUND OF THE INVENTION

1. Field of the Invention

The invention relates to the field of ultrasonic flowmeters and, in particular, to an ultrasonic flowmeter that combines flow conditioning technology with simple and inexpensive ultrasonic technology to yield high accuracy. The method and apparatus of the invention does not require the use of integration techniques or the prior determination of flow swirl or asymmetry to achieve accuracy. The invention also allows implementation of various self-diagnostic features.

2. Description of the Prior Art

Referring now to FIG. 1, flowmeters are generally classified as either energy additive or energy extractive. Energy additive meters introduce energy into the flowing stream to determine flowrate. Common examples of energy additive meters are magnetic meters and ultrasonic meters. Energy extractive meters require energy from the flowing stream, usually in the form of pressure drop, to determine the fluid's flowrate. Examples of energy extractive meters are PD meters, turbine meters, vortex meters and head meters (orifice, pitot, venturi, etc.).

Further subclasses of flowmeters are based on determining if the meter is discrete or inferential. Discrete meters determine the flowrate by continuously separating a flow stream into discrete segments and counting them. Inferential meters infer flowrate by measuring some dynamic property of the flowing stream.

Ultrasonic flowmeters are energy additive inferential flowmeters. They are well known in the art and can be further subclassified as shown in FIG. 2. Ultrasonic flowmeters determine the velocity of the flowing stream from the difference in transit time of acoustic pulses transmitted in the downstream and upstream directions between acoustic transducers. These acoustic pulses are transmitted along a chordal path, and a measure of the average chordal velocity is determined from the measured transit times. The fluid can be gas or liquid.

Transit times depend on the mean velocity of the chordal path, the flow profile and the turbulence structure of the flowing stream. The reliability of the measured chordal velocity depends on the path length, the configuration and radial position of the acoustic path, the transmitted acoustic pulse form, the electronic timing and gating performance and the calculations involved in reducing the measured parameters to the mean chordal velocity.

Acoustic transducers can be mounted in an invasive or non-invasive manner. An invasive mount invades the channel's containment structure through an aperture and allows the transducer to transmit acoustic pulses directly into the flowing stream. Invasively mounted transducers are also referred to as "wetted" transducers. A non-invasive mount transmits the acoustic pulses through all or part of the channel's containment structure. Transducers mounted in this fashion are also referred to as "non-wetted" transducers.

The invasive mount is further classified as intrusive or non-intrusive. Intrusive mounting means that all or part of a transducer intrudes into the flowing stream. Non-intrusive mounting means that the transducer is recessed and does not intrude into the flowing stream.

Acoustic paths may be arranged in a reflective, non-reflective or hybrid geometry. A reflective path is arranged in a geometric manner to reflect one or more times off the containment structure or reflective bodies installed inside the channel. A non-reflective path is arranged in a geometric manner that does not reflect off the containment structure or a reflective body inside the channel. A hybrid is a design that employs both reflective and non-reflective paths. The number of paths and their placement in the channel vary among state of the art designs.

Ultrasonic flowmeters have been the center of attention within the natural gas industry for the last decade. State of the art ultrasonic flowmeters employ one of two commercially available integration methods to determine the average flow velocity in a circular duct. A third integration method is under development by the scientific community. Both commercial methods perform well in the laboratory environment of "fully developed" pipe flow. However, in the industrial environment, multiple piping configurations assembled in series generate complex problems for flow-metering engineers. The challenge is to minimize the difference, i.e. achieve "similarity," between the actual, field flow conditions and laboratory, "fully developed" flow conditions. The correlating parameters which impact similarity vary with meter type and design. However, it is generally accepted that the level of sensitivity to time-averaged velocity profile, turbulence structure, and bulk swirl is dependent on the metering technology and the specific design of that meter.

The first integration method, known as Gaussian integration, is based on a fixed number of paths whose locations and correction factors are based on the numerical Gaussian method selected by the designer. Several Gaussian methods are available from publications (Jacobi & Gauss, Pannell & Evans, etc.) or disclosed in U.S. Patents such as U.S. Pat. Nos. 3,564,912, 3,940,985, and 4,317,178. The advantages of this approach are clear. No additional information of the flow profile is required for calculating the average flowing velocity. The correction factors are fixed in advance as a result of the number of paths and the Gaussian method selected by the designer. Gaussian integration methods require at least four paths to yield acceptable results. Based on available public research, Gaussian integration methods have a bias uncertainty of up to 3% due to variations in piping configuration.

The second integration method, disclosed in U.S. Pat. No. 5,546,812, determines the swirl and asymmetry of the flowing stream by transmitting acoustic pulses along two or more paths having different degrees of sensitivity to swirl and to symmetry. This method uses a conversion matrix to determine the correction factors for the chordal velocities based on the measured swirl and asymmetry. The recommended number of paths is five for the proprietary method. According to available literature, this integration method has an additional bias uncertainty of up to 1% due to variations in piping configuration.

The third integration method, now under development by the National Institute of Standards and Technology (NIST)

is an eleven-path arrangement. The unit, termed the advanced ultrasonic flowmeter (AUFM), is based on computer modeling of pipe flow fields and simulations of their corresponding ultrasonic signatures. The sensor arrangement for the AUFM will have enhanced velocity profile diagnostic capabilities for deviations from non-ideal pipe flows. A pattern recognition system capable of classifying the approaching unknown flow among one of a number of typical flows contained in an onboard, electronic library will interpret the acoustic signals. The flow library will be created using results from computational fluid dynamics simulations. No bias uncertainty information is currently available for this experimental integration technique.

All of the state of the art ultrasonic flowmeters suffer from the disadvantage of high cost due to the requirement of at least four paths (up to eleven paths in the AUFM). Each path requires a pair of transducers with associated mounting mechanisms and wiring. Thus current ultrasonic flowmeters are costly and maintenance intensive. In addition, under real-world industrial conditions, current ultrasonic flowmeters suffer relatively high bias uncertainty errors due to swirl and asymmetry effects. These disadvantages are overcome by the present invention.

SUMMARY OF THE INVENTION

The present invention combines simple ultrasonic technology with isolating flow conditioner technology to determine the flow velocity in a channel. The performance of this novel combination exceeds current state of the art ultrasonic flowmeter performance by an order of four to twelve times and offers significant savings in manufacturing costs. In addition, this novel device allows the creation of a method for measuring the "real time" health of the flowmeter.

The isolating flow conditioner section of the present invention eliminates swirl (defined as reducing swirl or radial velocity perpendicular to the direction of flow to less than 2 degrees) and eliminates asymmetry (defined as less than 5% difference in flow velocity between parallel chords on opposing sides of the flow axis) upstream of the ultrasonic meter section. Acoustic pulses are then transmitted along a chordal path within the conditioned flow and the chordal velocity is determined from the measured transit times. A correction factor is then applied to the "raw" chordal velocity to determine a highly accurate "corrected" measure of chordal velocity. The correction factor can be a weighting factor as further described below, or it can be a calibration factor based upon laboratory testing of that particular flowmeter. A calibration factor may be applied in lieu of the weighting factor or in addition to the weighting factor.

In designs that use a single-path ultrasonic flowmeter section, a weighting factor based upon the geometry of the acoustic path and the turbulence level of the flowing medium is used. Designs with an ultrasonic flowmeter section that has more than one path can further refine the weighting factor based upon a relaxation term, which is a measure of flow profile development. Use of weighting factors provides high accuracy without the necessity for laboratory testing and calibration of individual flowmeters.

A further advantage of the present invention is that the combination of isolating flow conditioner technology with ultrasonic flowmeter technology enables a self-diagnostic capabilities for measuring the "real time" health of the flowmeter. A one-path design provides a low-level capability for measuring flowmeter health, while multi-path designs provide a high-level capability. In the industrial environment, a flowmeter with such built-in diagnostic capabilities is referred to as a "smart" flowmeter.

A further advantage of the present invention is that it can be used in a variety of different channel cross-sections, including cylindrical, square, rectangular, curved rectilinear or a U-shaped cross-sections, without any accuracy degradation.

BRIEF DESCRIPTION OF THE DRAWINGS

A better understanding of the present invention can be obtained when the following detailed description of the preferred embodiment is considered in conjunction with the following drawings, in which.

DESCRIPTION OF THE PREFERRED EMBODIMENTS

Figure 1:
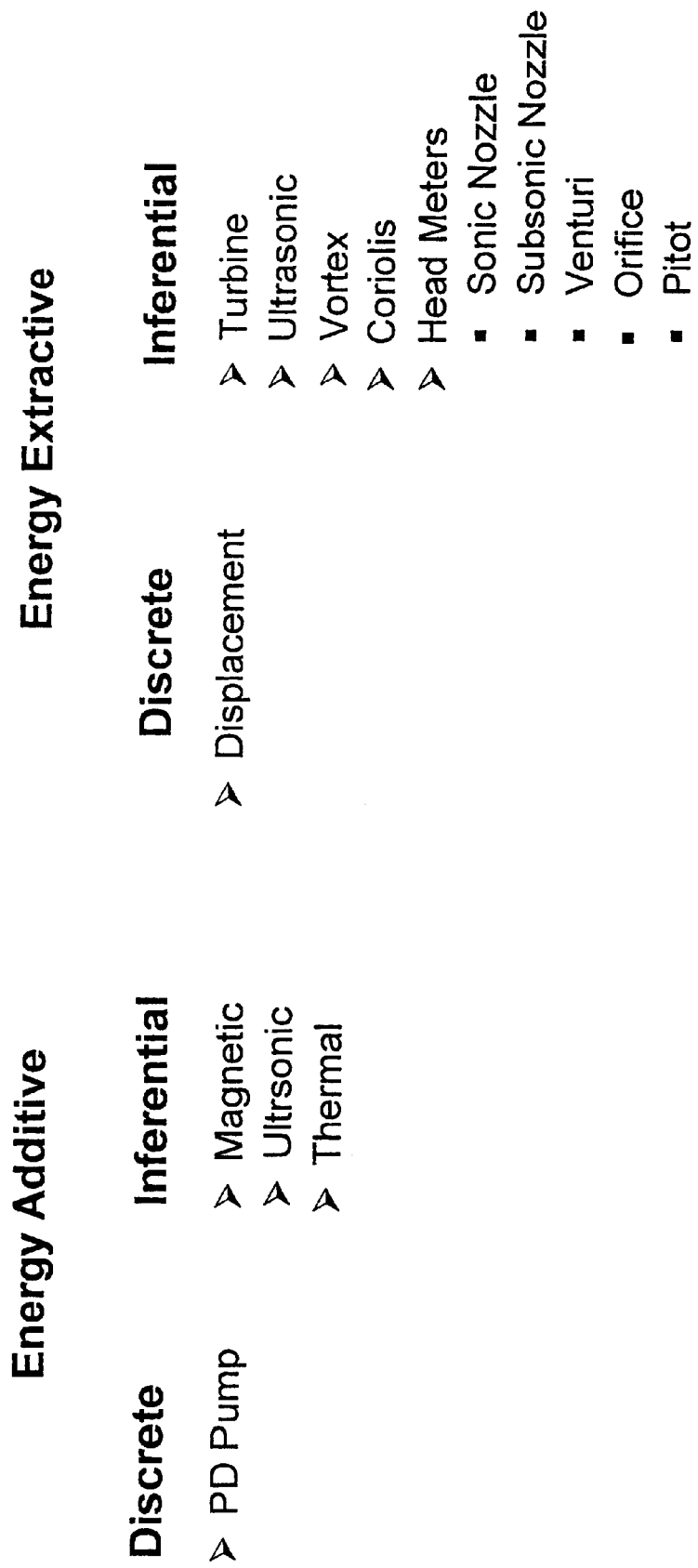
FIG. 1 is a chart showing current classifications of flowmeters.
Figure 2:
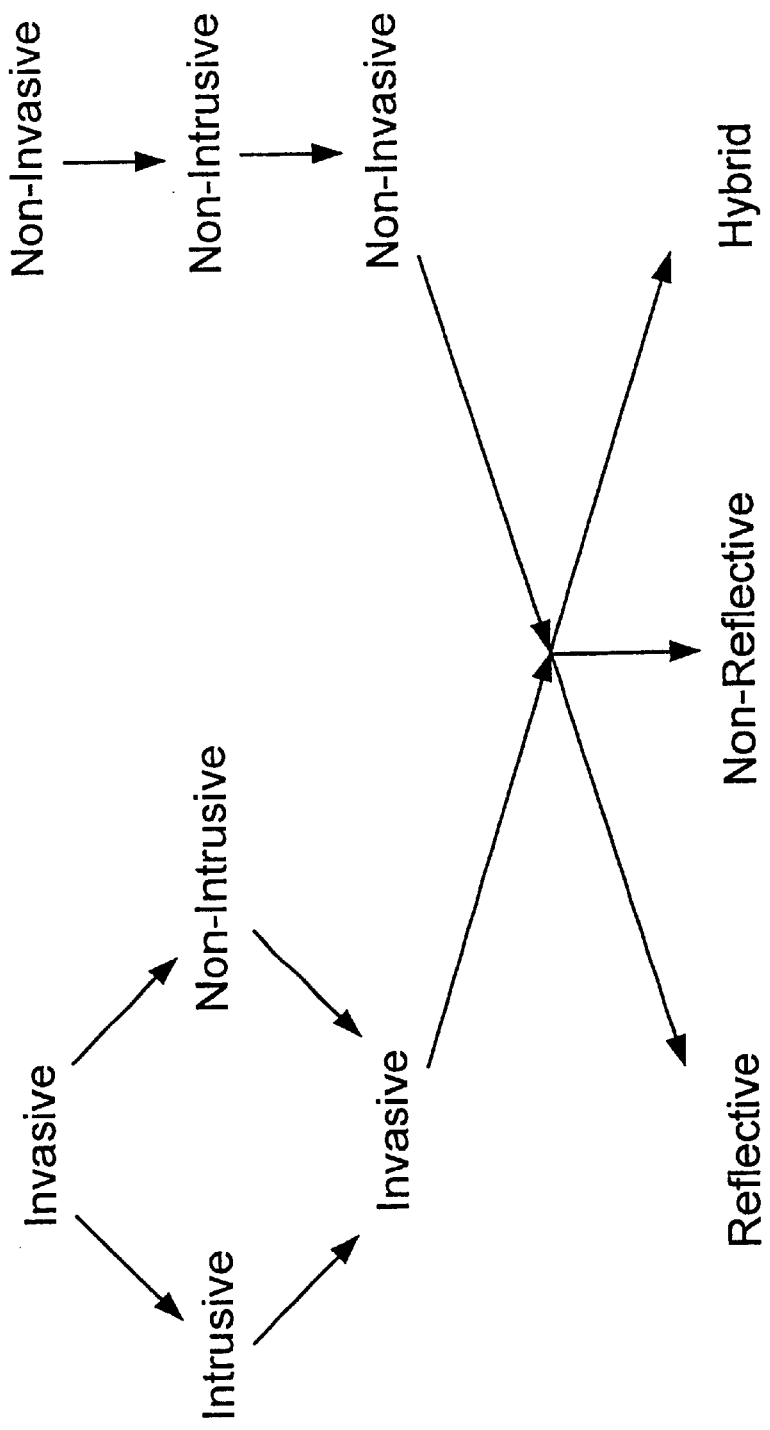
FIG. 2 is a chart showing current classifications of ultrasonic flowmeters.
Figure 3:
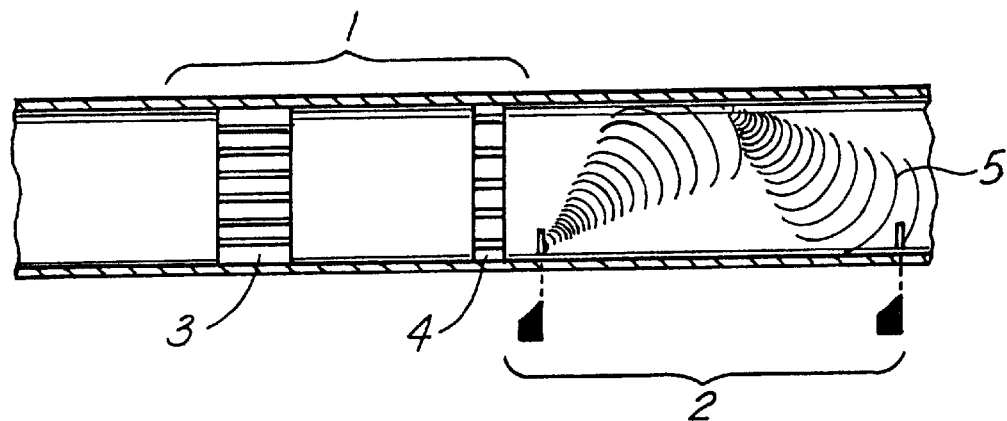
FIG. 3 is a side view, not to scale, of an embodiment of the flowmeter according to the present invention.
Figure 4:
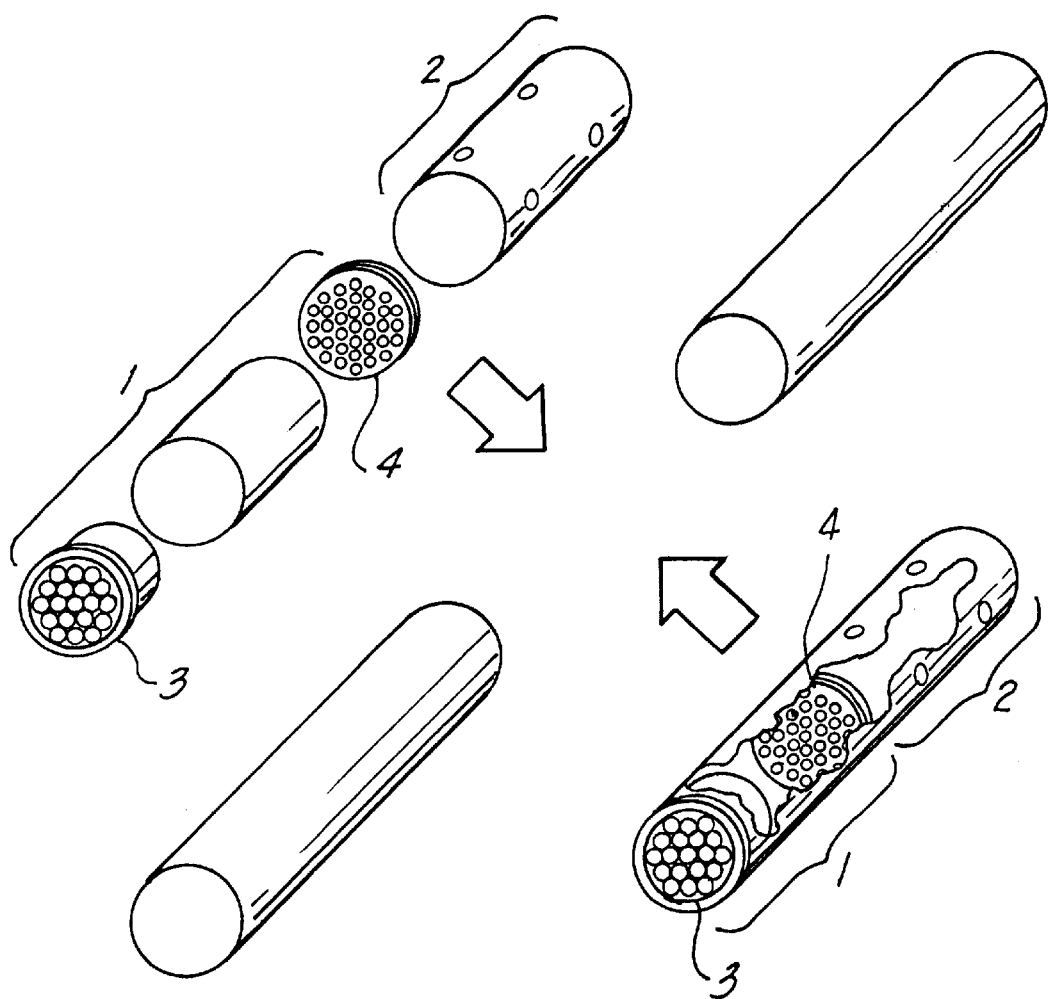
FIG. 4 is a perspective view, not to scale, showing the installation of alternative embodiments of the present invention in a pipe line.

Referring now to FIGS. 3 and 4, the present invention combines an isolating flow conditioner section 1 with an ultrasonic flowmeter section 2. The isolating flow conditioner section 1 of the present invention eliminates swirl (defined as reducing swirl or the ratio of radial velocity to axial velocity to less than 2 degrees) and eliminates asymmetry (defined as less than 5% difference in flow velocity between parallel chords on opposing sides of the flow centerline) upstream of the ultrasonic meter section 2. In the preferred embodiment, the isolating flow conditioner section 1 consists of an anti-swirl device 3 followed by a profile device 4 as shown in FIGS. 3 and 4. However, the isolating flow conditioner section 1 could also consists of various combinations of other devices, such as nozzles, contractions, anti-swirl devices, profile devices, and static mixers. The important parameter for any combination is the elimination of swirl and the achievement of axisymmetrical flow (both as defined above).

Acoustic pulses 5 are transmitted along chordal path(s) in an ultrasonic flowmeter section 2 that is downstream of the isolating flow conditioner section 1. As the measurements occur within conditioned flow, the "raw" chordal velocity measurements determined from the measured transit times are fairly accurate even without correction. However, the preferred embodiment improves accuracy even further by applying correction factors to the "raw" chordal velocities to determine corrected chordal velocities. The correction factors may be weighting factors (as defined below), calibration factors based upon actual laboratory testing of the specific flowmeter, or a combination of weighting factors and calibration factors. Application of calibration factors is only required where ultra-high accuracy is sought.

A fixed weighting factor based upon the geometry of the acoustic path(s) and the turbulence level of the flow can be used with any ultrasonic flowmeter section design. Designs with a multi-path ultrasonic flowmeter section that has at least two paths with differing geometries can further refine the weighting factor based upon a relaxation term, which is a measure of flow profile development.

The preferred embodiment of the present invention also incorporates self-diagnostic capabilities for measuring the "real time" health of the flowmeter. One-path and multi-path designs provides the following "low-level" self-diagnostic capabilities:

1. Comparison of the digital archives of the flowmeter during dynamic calibration to the "real time" operation to determine "key" anomalies;
2. Comparison of the operational digital archives of the flowmeter to the "real time" operation to determine "key" anomalies;
3. Timing clock stability based upon bias error from equation of state's predicted velocity of sound and the actual measured chordal velocity of sound;
4. Proper acoustic path lengths based upon bias error from equation of state's predicted velocity of sound and the actual measured chordal velocity of sound;
5. Proper programming associated with the calibration parameters based upon bias error from equation of state's predicted velocity of sound and the actual measured chordal velocity of sound; and
6. Analysis of fluid variations or particulate deposits on the containment structure, the invasive transducer's face, or the mounting pockets based upon analysis of acoustic pulse train strength or distortion and bias error from equation of state's predicted velocity of sound and the actual measured chordal velocity of sound.

A multi-path design provides the following additional "high-level" self-diagnostic capabilities:

1. Enhanced timing clock stability analysis based upon range between the various chordal velocity of sound measurements;
2. Enhanced mechanical path angle analysis based upon: (a) range between raw chordal velocities in parallel path geometries; and/or (b) range between corrected chordal velocities in parallel or non-parallel path geometries;
3. Enhanced acoustic path length analysis based upon: (a) range between raw chordal velocities in parallel path geometries; (b) range between corrected chordal velocities in parallel or non-parallel path geometries; and/or (c) ratio between raw chordal velocities in non-parallel geometric paths;
4. Enhanced calibration parameters programming analysis based upon: (a) range between raw chordal velocities in parallel path geometries; (b) range between corrected chordal velocities in parallel or non-parallel path geometries; (c) ratio between raw chordal velocities in non-parallel geometric paths; and/or (d) range between chordal velocity of sound measurements;
5. Integration accuracy based upon: (a) range between raw chordal velocities in parallel path geometries; (b) range between corrected chordal velocities in parallel or non-parallel path geometries; and/or (c) ratio between raw chordal velocities in non-parallel geometric paths;
6. Proper electronics performance based upon: (a) range between corrected chordal velocities in parallel or non-parallel path geometries; and/or (b) range between chordal velocity of sound measurements;
7. Proper acoustic probe performance based upon: (a) range between corrected chordal velocities in parallel or non-parallel path geometries; and/or (b) range between chordal velocity of sound measurements;
8. Stability of delta time delays for each acoustic probe based upon: (a) range between raw chordal velocities in parallel path geometries; and/or (b) range between corrected chordal velocities in parallel or non-parallel path geometries;
9. Signature recognition software based upon: (a) range between raw chordal velocities in parallel path geometries; and/or (b) range between corrected chordal velocities in parallel or non-parallel path geometries; and
10. Enhanced analysis of fluid variations or particulate deposits on the containment structure, the invasive transducer's face or the mounting pocket based upon: (a) range between raw chordal velocities in parallel path geometries; (b) range between corrected chordal velocities in parallel or non-parallel path geometries; and/or (c) ratio between raw chordal velocities in non-parallel geometric paths.

All of these "real time" self-diagnostic health validations greatly improve the confidence in the performance of the flowmeter.

In the preferred embodiment, each chordal path has associated values for path angle, path length, weighting factor and calibration factor. Also in the preferred embodiment, the following specifications are used as alarm points for the self-diagnostic tests:

1. Bias error from equation of state's predicted velocity of sound and actual measured chordal velocity of sound should not vary by more than 0.25%;
2. Range between chordal velocities in parallel path geometry: (a) "raw" chordal velocities between non-reflective chords in a parallel plane should not differ by more than 5%; and (b) "raw" chordal velocities between reflective chords in parallel planes should not differ by more than 2.5%;
3. Range between chordal velocities in parallel or non-parallel geometric paths: (a) corrected chordal velocities between non-reflective chords should not differ by more than 5%; and (b) corrected chordal velocities between reflective chords should not differ by more than 2.5%. Corrected chordal velocity refers to chordal velocity computed by applying the path's weighting factor, calibration factor, or weighting factor and calibration factor to the "raw" chordal velocity measurement.

Referring now to FIG. 4, the flowmeter of the present invention can be built into a pipeline by assembling various discrete segments containing the isolating flow conditioner devices and the ultrasonic measuring devices into the pipeline. In another embodiment, all of the devices making up the flowmeter of the present invention are integrated into a single flowmeter body that can be installed into a pipeline as a single robust unit.

Figure 5A:
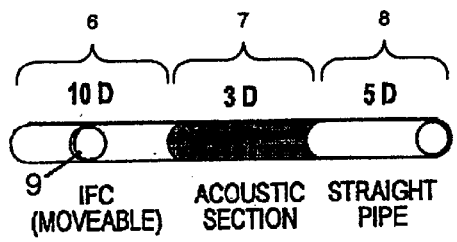
FIG. 5A is a schematic diagram showing the test section used in the empirical tests of the flowmeter according to the present invention.

The flowmeters according to the present invention were tested by an outside research laboratory. Experiments were conducted with natural gas. As shown in FIG. 5A, the experiments utilized a test section consisting of a 10D isolating flow conditioner section 6, a 3D acoustic section 7, and a 5D exhaust section 8 (where D is the pipe diameter). The isolating flow conditioner 9 could be positioned anywhere within the 10D isolating flow conditioner section 6 and was tested at 0D, 1D, 2D, 3D, 4D, and 5D upstream of the acoustic section 7.

Figure 6A:
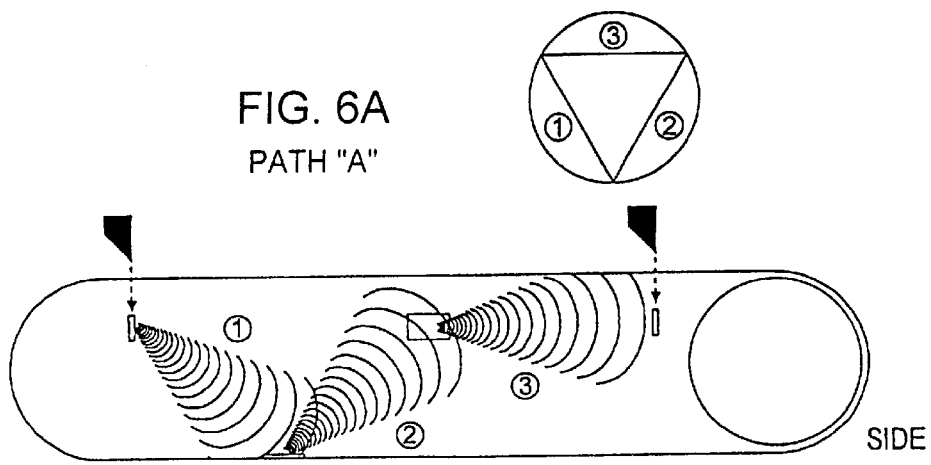
FIG. 6A is a side and end view of the first acoustic path used in the test section for the empirical tests of the flowmeter according to the present invention.
Figure 6B:
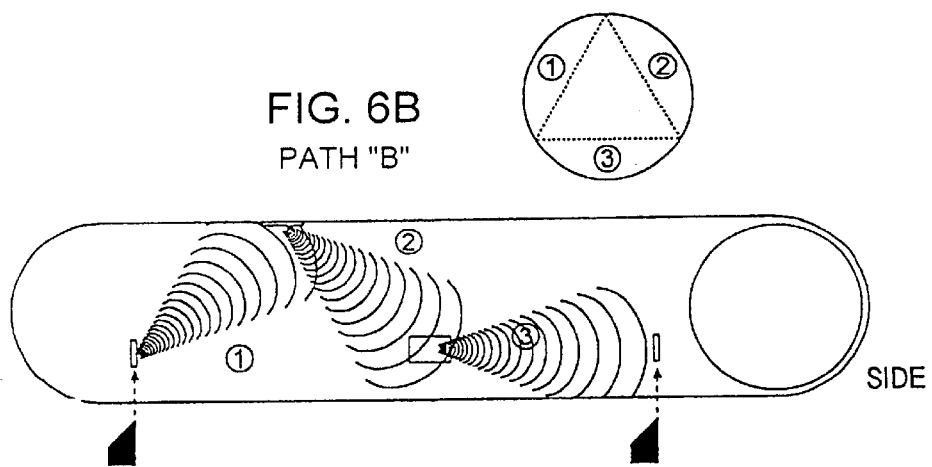
FIG. 6B is a side and end view of the second acoustic path used in the test section for the empirical tests of the flowmeter according to the present invention.
Figure 6C:
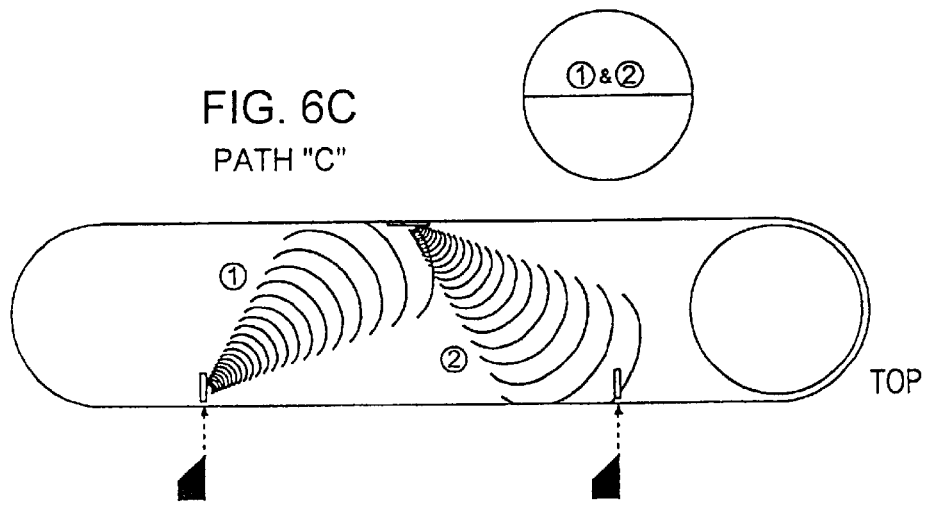
FIG. 6C is a side and end view of the third acoustic path used in the test section for the empirical tests of the flowmeter according to the present invention.

The acoustic section had three paths as shown in FIGS. 6A–6C. The first path (Path "A"), shown in FIG. 6A, was a double reflection, mid-radius chord that appears as an inverted triangle in end view perspective. The second path, shown in FIG. 6B (Path "B"), was a double reflection, mid-radius chord that appears as an upright triangle in end view perspective. The third path, shown in FIG. 6C (Path "C"), was a single reflection, centerline chord that appears as a bisecting line in end view perspective. All three paths were active during the tests. By analyzing each path separately and then in conjunction with other paths, each flow test simultaneously provided empirical data on single-path meters, two-path meters and three-path meters.

Figure 5B:
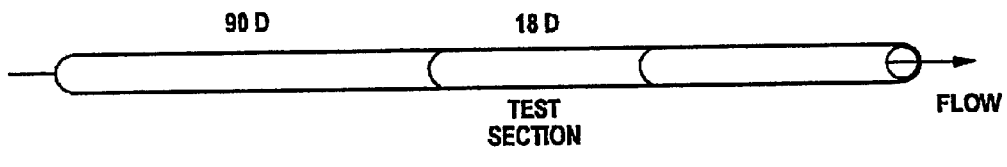
FIG. 5B is a schematic diagram showing the "Baseline" piping configuration used for empirical tests of the flowmeter according to the present invention.
Figure 5C:
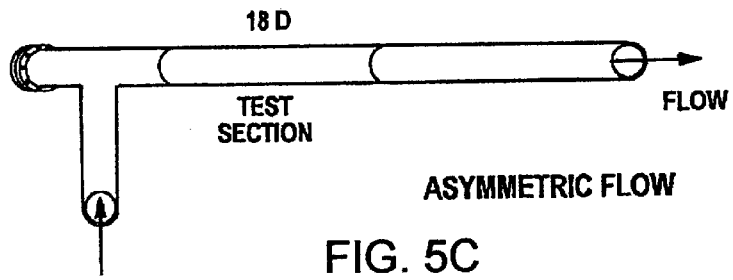
FIG. 5C is a schematic diagram showing the "T" piping configuration used for empirical tests of the flowmeter according to the present invention.
Figure 5D:
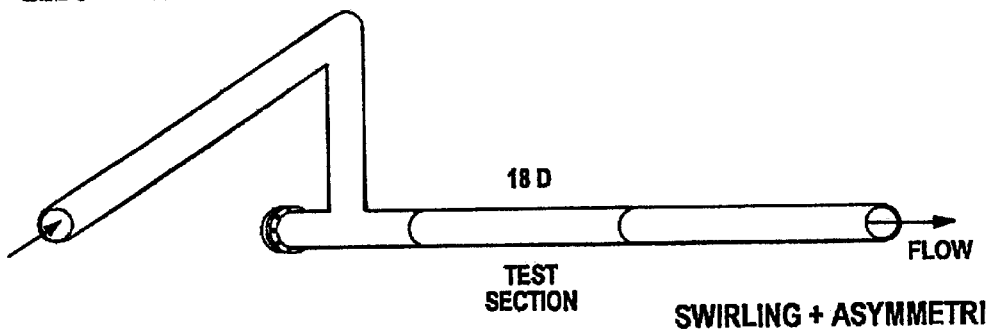
FIG. 5D is a schematic diagram showing the "Elbow+T" piping configuration used for empirical tests of the flowmeter according to the present invention.

Three test loops were used, each designed to impart certain characteristics to the test section gas flow. As shown in FIG. 5B, the "Baseline" test loop flowed natural gas through a 90D section of straight pipe into the test section. This test loop provided fully-developed "laboratory" flow without swirl or asymmetry to the test section. The "Tee" test loop, shown in FIG. 5C, attached the test section directly to a pipe tee and provided asymmetric flow to the test section. The "Elbow+Tee" test loop, shown in FIG. 5D, flowed natural gas through an elbow and a pipe tee out of plane to provide asymmetric and swirling flow to the test section.

Single Path Research

Figure 7A:
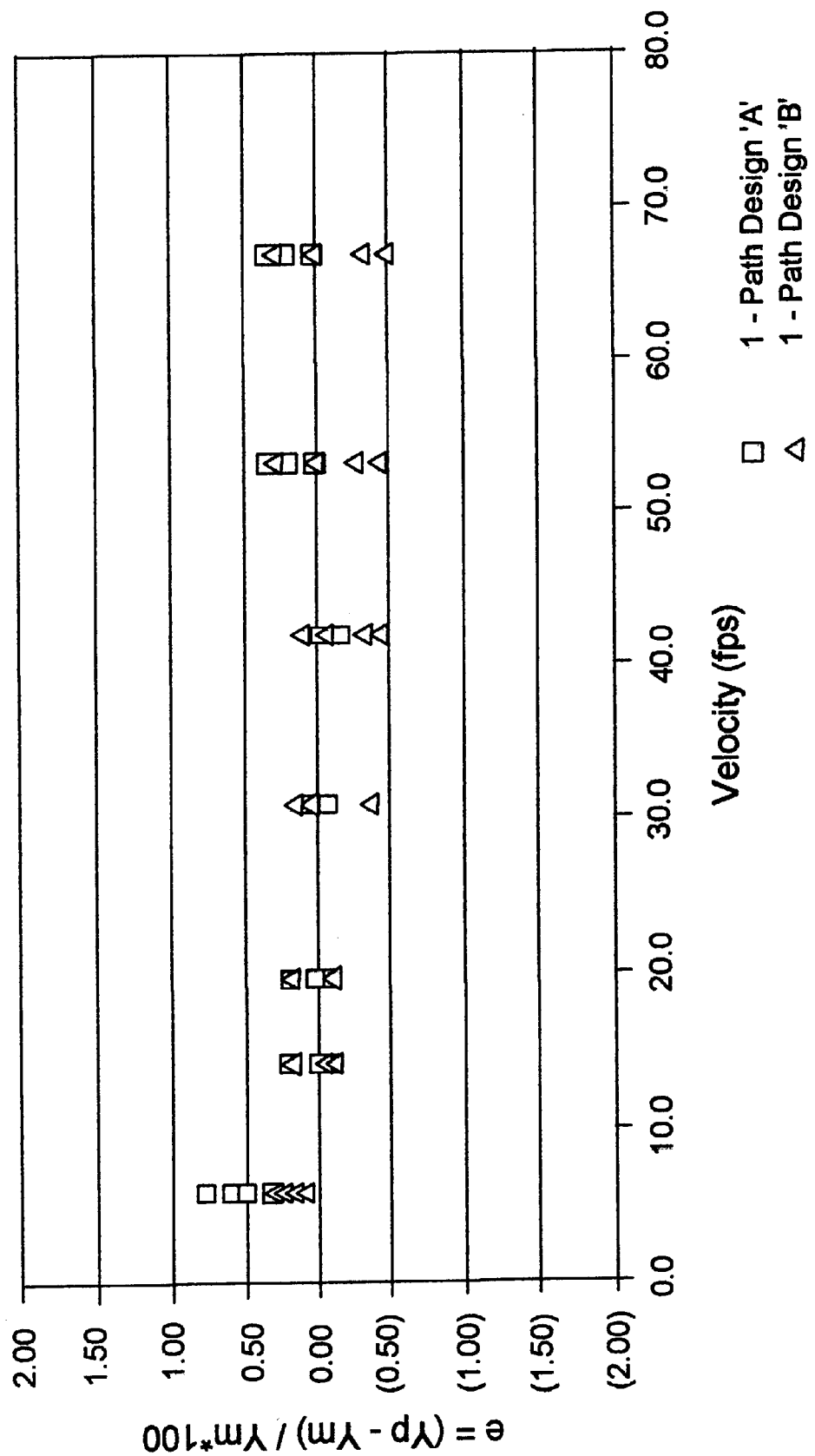
FIGS. 7A–C are graphs showing the magnitude of one-path flowmeter error for various flow velocities.
Figure 7B:
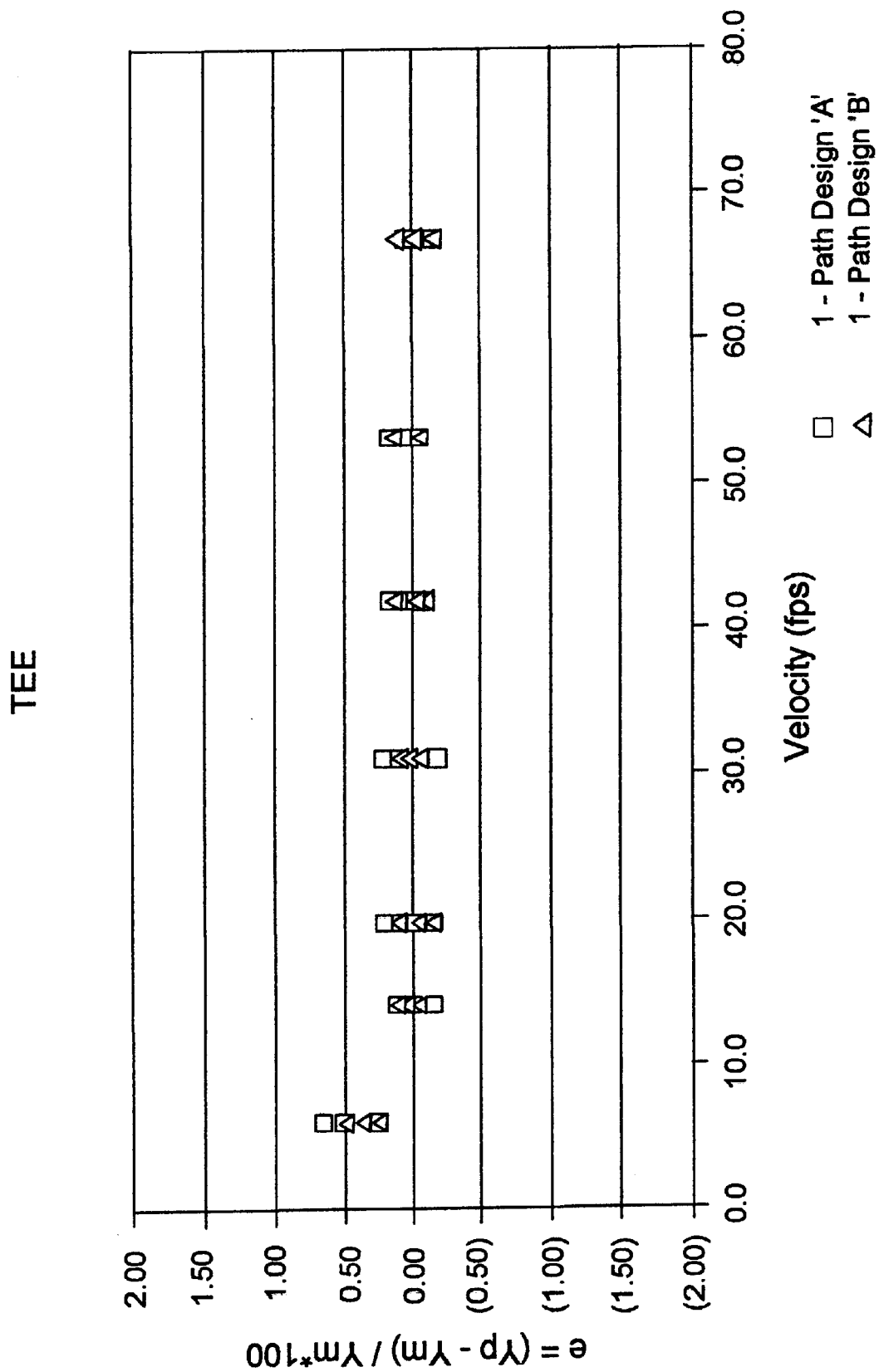
Figure 7C:
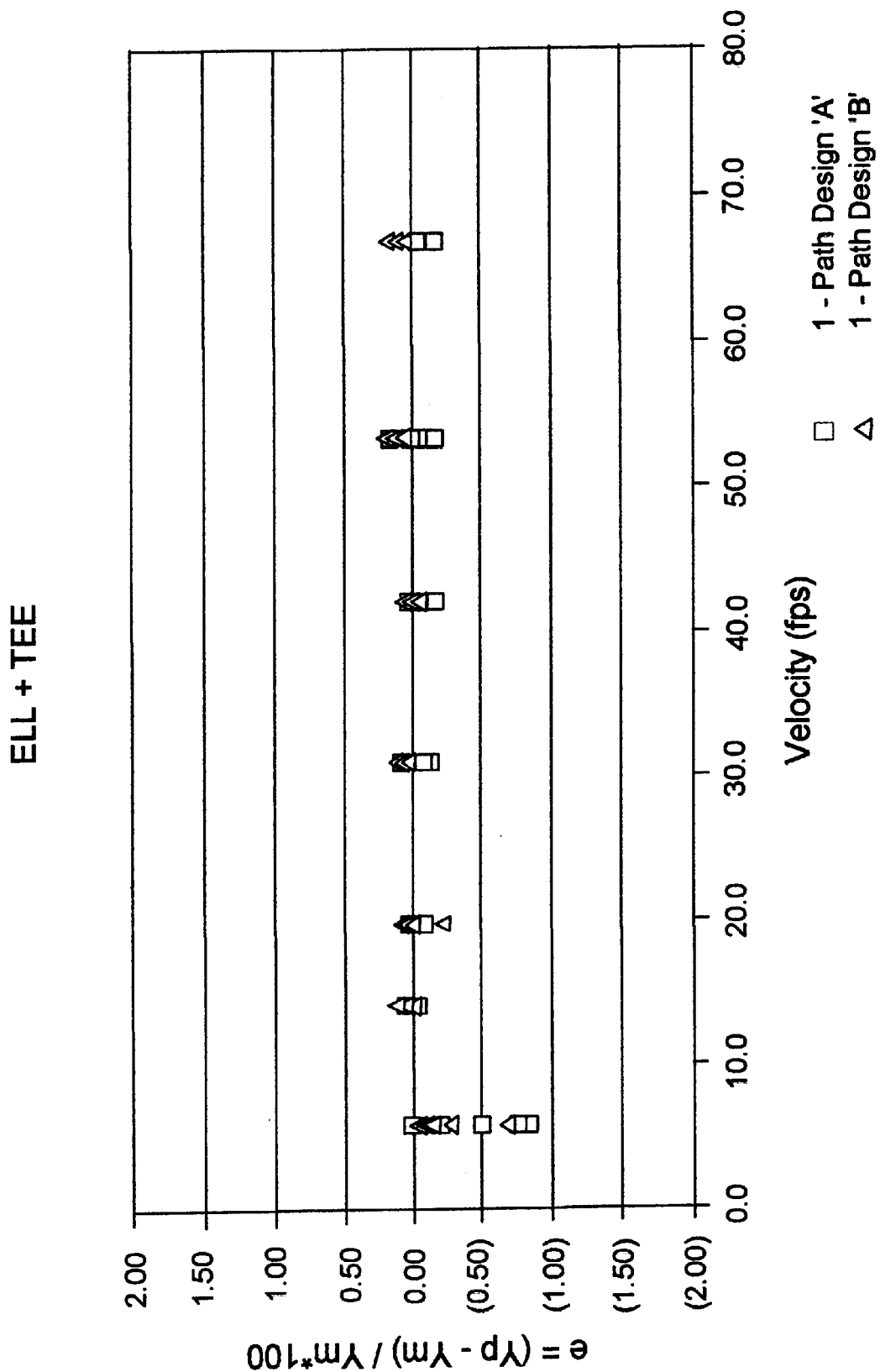

Using the above test loops, perturbation tests were conducted under the following fluid dynamic conditions: (a) fully developed flow (FIG. 7A); (b) asymmetric, non-swirling flow (FIG. 7B); and (c) asymmetric, swirling flow (FIG. 7C). Multiple test runs were made with the isolating flow conditioner located at various positions upstream from the acoustic section. Each test run spanned a range of flow velocities. For each flow velocity and isolating flow conditioner location, residual error ("e") values were plotted for Paths "A" ("Design 'A'") and "B" ("Design 'B'"). Residual error is the difference between predicted weighting factor ("Yp") and empirical weighting factor ("Ym") as a percentage of empirical weighting factor.

The predicted weighting factors were calculated according to the present invention. Each weighting factor included a path geometry term, and a turbulence term. For the single-path device, the relaxation term was constant due to the inability to measure relaxation absent more than one path. Representative values are shown in the table below:

| | Baseline Test Loop Path "A"/IFC @ 3D | Elbow + Tee Test Loop Path "B"/IFC @ 1D |
|---|---|---|
| Path Geometry | 0.8460 | 0.8460 |
| Relaxation | 0.1616 | 0.1616 |
| Turbulence | 0.0010 | 0.0037 |
| Predicted ("Yp") | 1.0086 | 1.0113 |
| Empirical ("Ym") @ 67 fps | 1.0092 | 1.0086 |
| Residual Error ("e") | −0.06% | 0.27% |

Note that in the case of Path "A" and Path "B", the path geometry terms are identical. This is because both paths are double reflection mid radius chords. A differing path geometry would result in a different path geometry weighting factor.

The experiments demonstrated the validity of the novel concept. The single-path device demonstrated a residual error of less than 0.5% with flow velocities greater than 5 feet per second. Since the empirical weighting factor is based upon actual flow rate of the test loop, this means that the predicted weighting factors calculated according to the present invention produce measured flowrates that were within 0.5% of the actual flowrates in both perturbed and "laboratory" flow conditions. This performance, produced through the combination of effective flow conditioning and the application of accurate predicted weighting factors, is far better than current state of the art Gaussian integration flowmeters and equals the performance of five-path proprietary integration flowmeters while using only one fifth of the transducers and chordal paths. This results in considerable savings in manufacturing and maintenance costs.

Multi-Path Research

Figure 8A:
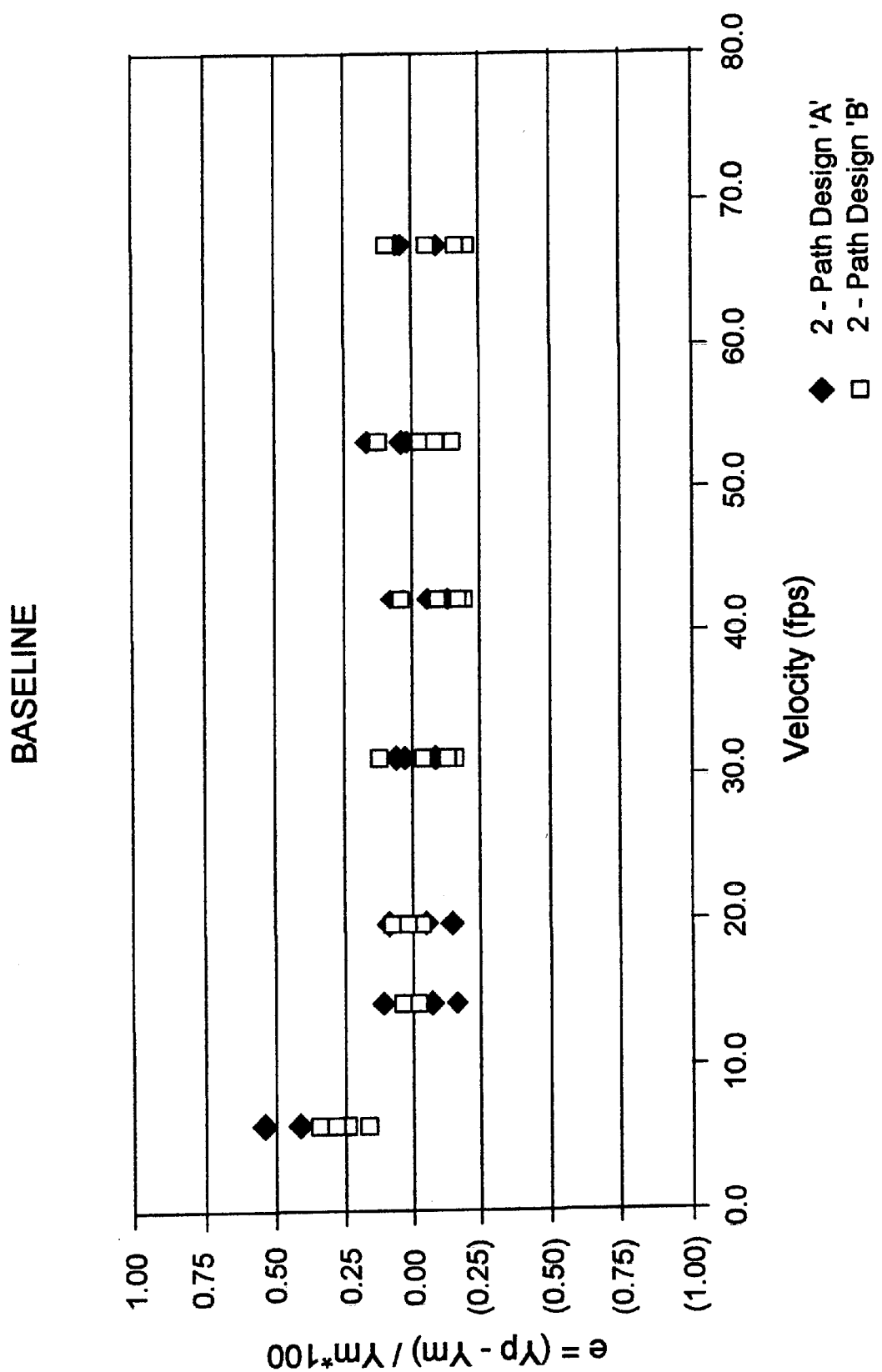
FIGS. 8A–C are graphs showing the magnitude of two-path flowmeter error for various flow velocities.
Figure 8B:
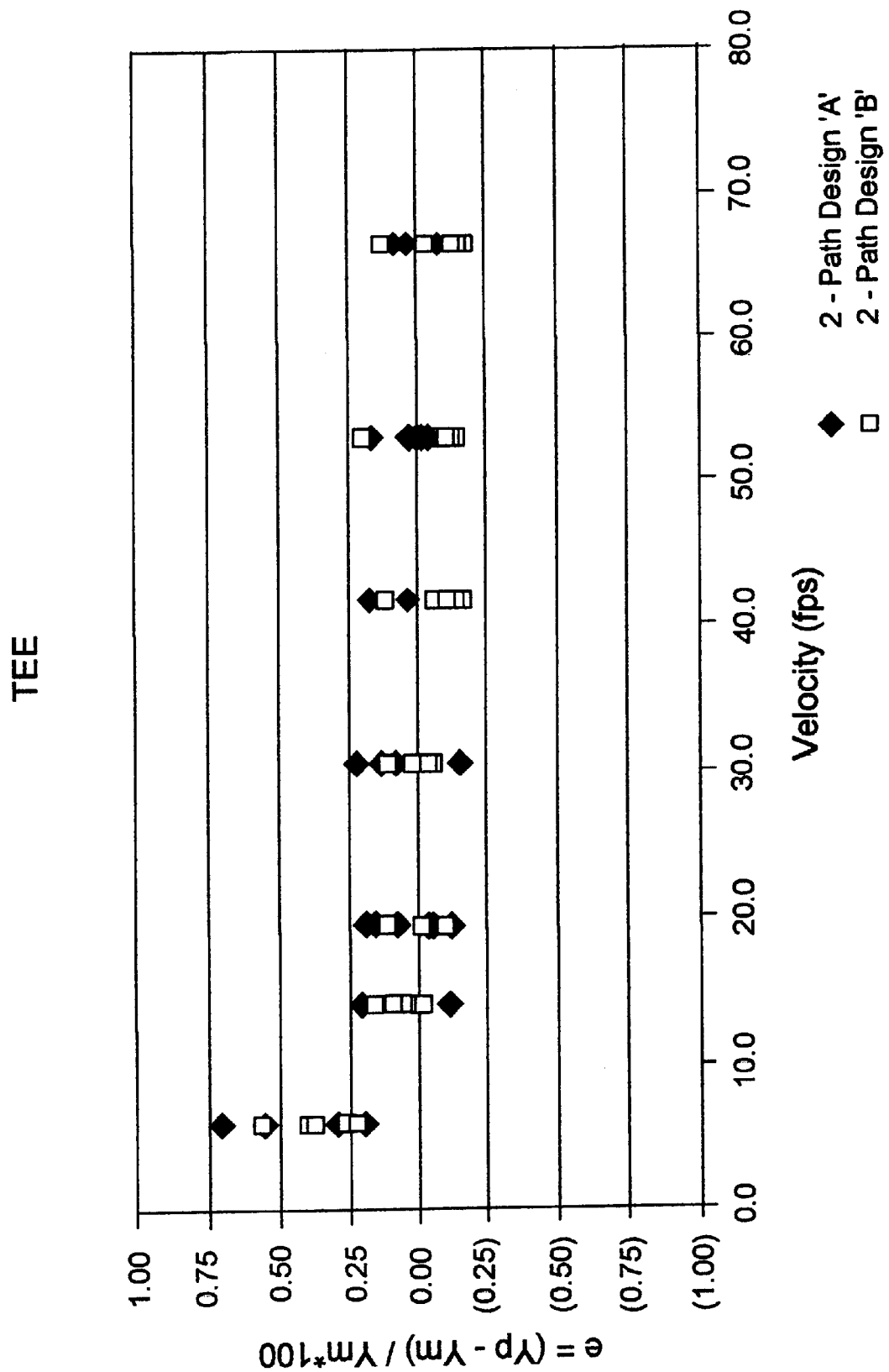
Figure 8C:
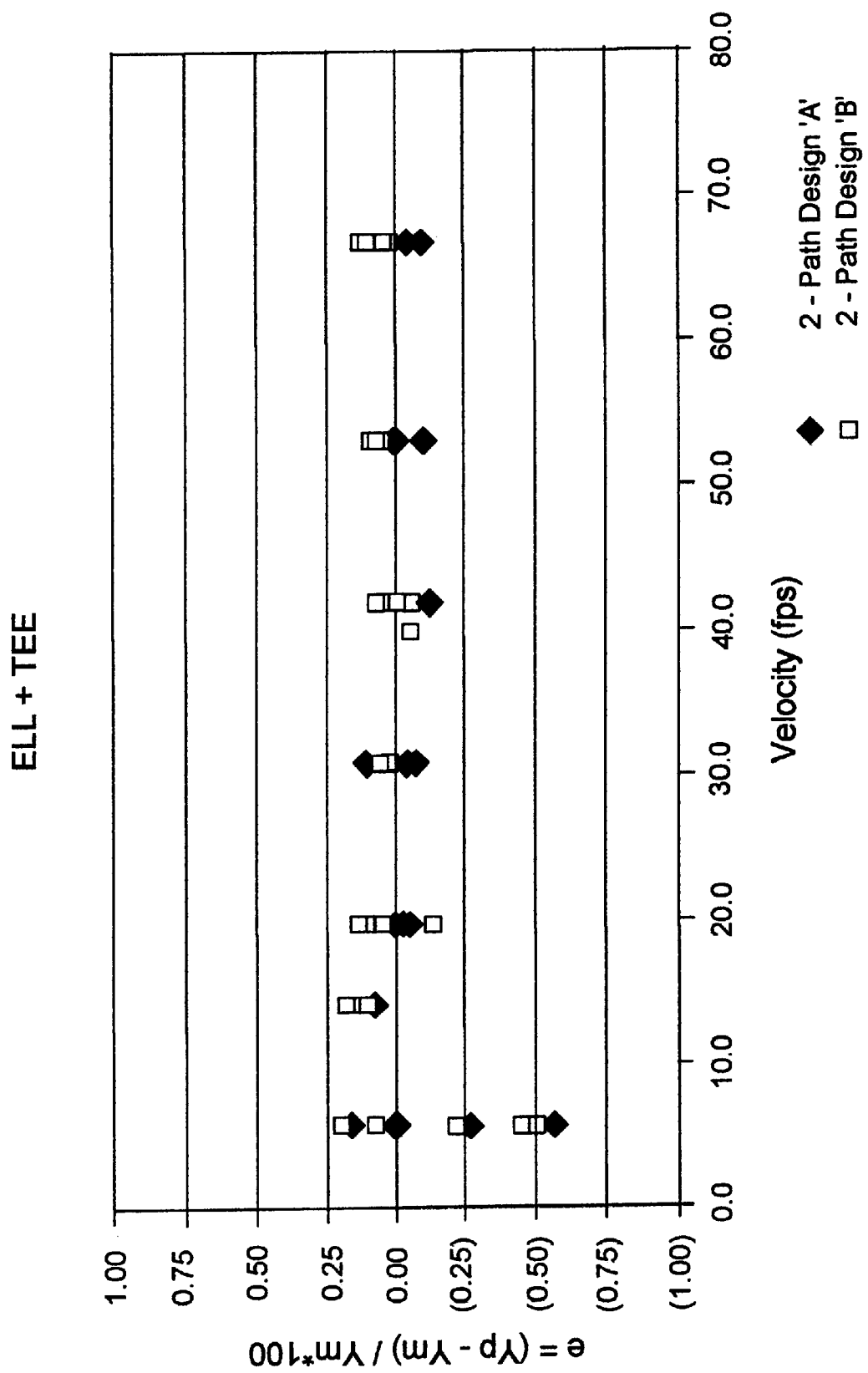
Figure 9A:
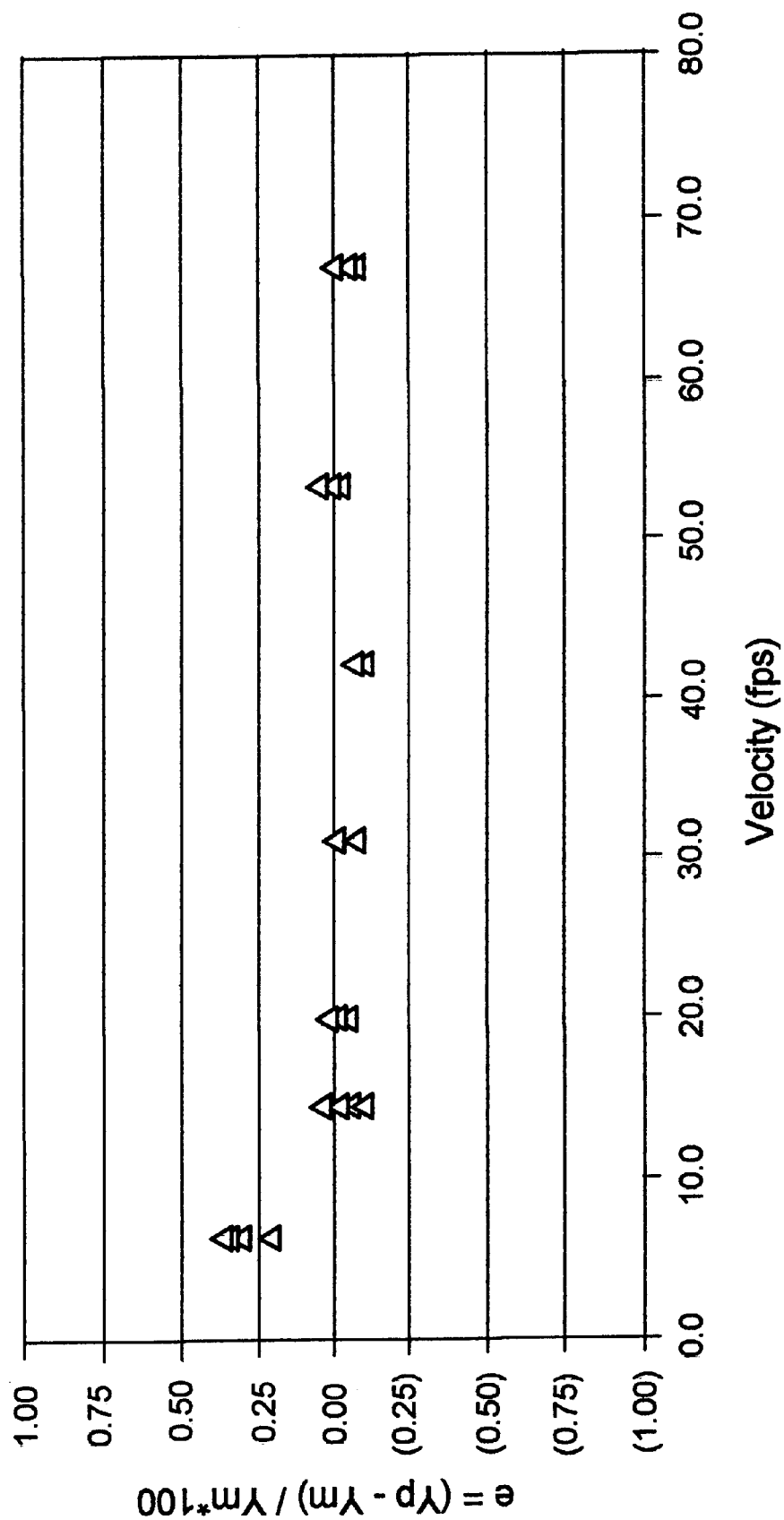
FIGS. 9A–C are graphs showing the magnitude of three-path flowmeter error for various flow velocities.
Figure 9B:
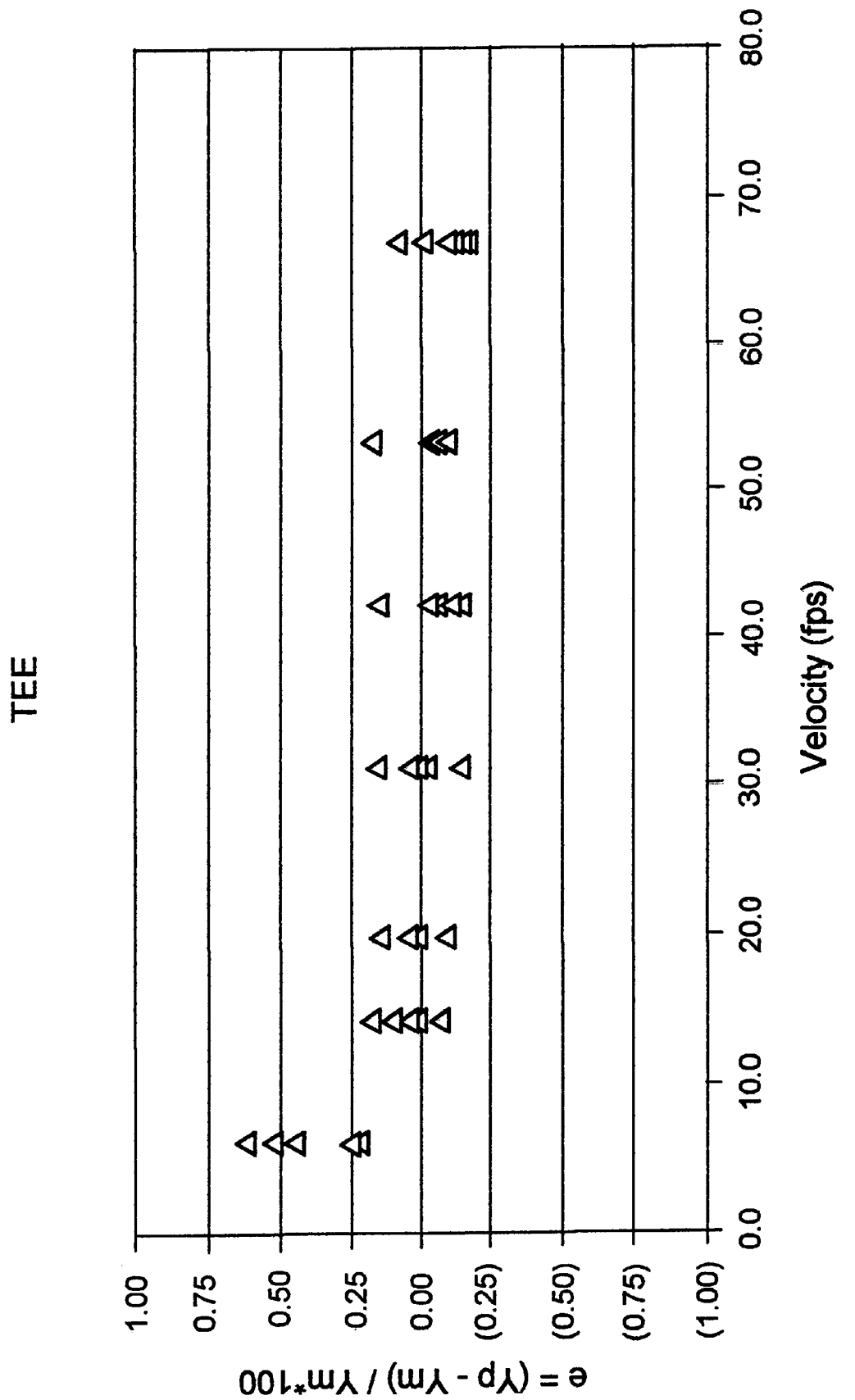
Figure 9C:
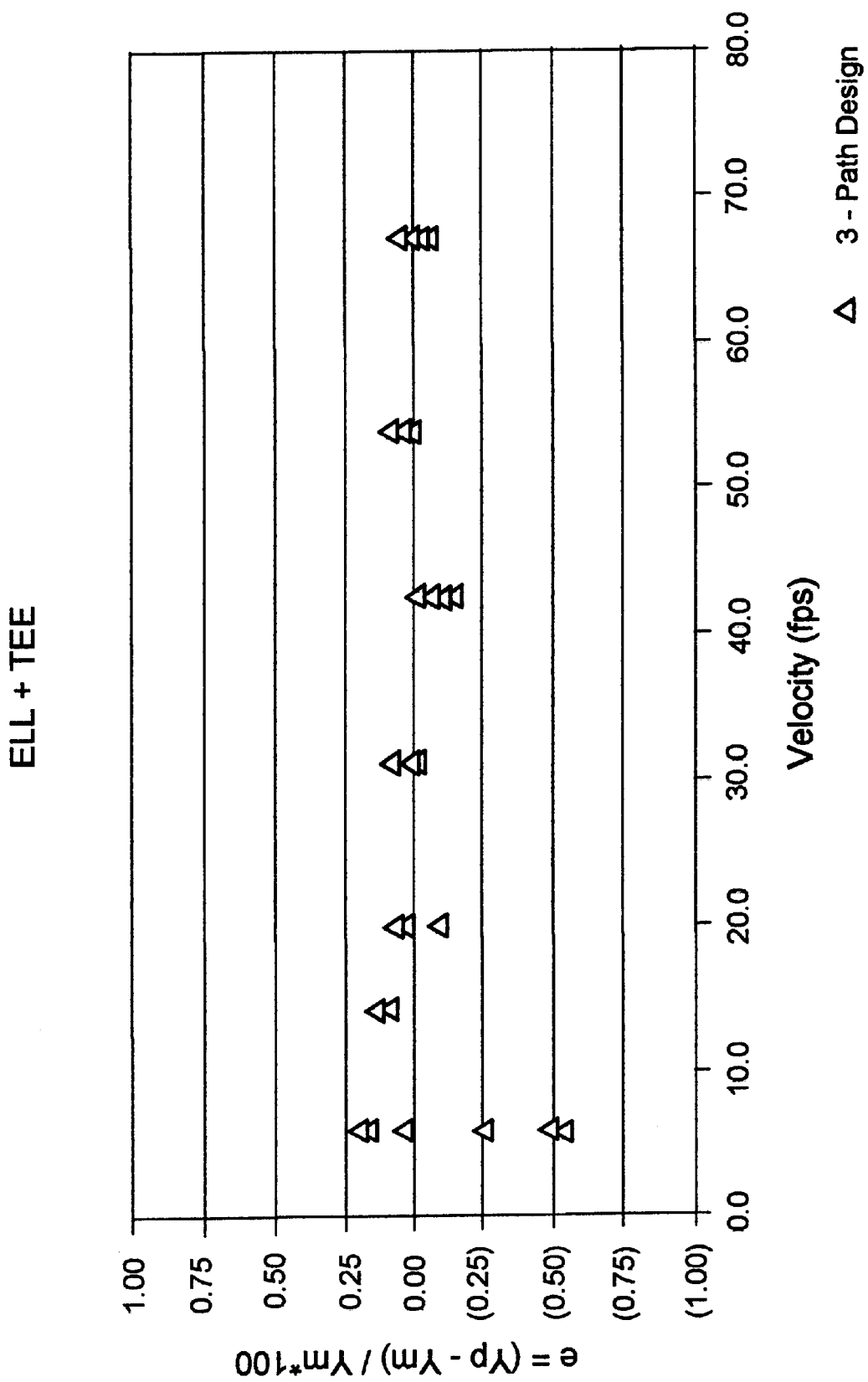

Two-path and three-path performances were also analyzed based upon the previously described test runs. Two-path results are shown in FIGS. 8A (fully developed flow), 8B (asymmetric, non-swirling flow), and 8C (asymmnetric, swirling flow). Likewise, three-path results are shown in FIGS. 9A (fully developed flow), 9B (asymmetric, non-swirling flow), and 9C (asymmetric, swirling flow). In the two-path charts, for each flow velocity and isolating flow conditioner location, residual error values ("e") were plotted for Design "A" (combination of Path "A" and Path "C") and Design "B" (combination of Path "B" and Path "C"). In the three-path charts, each residual error value ("e") combines Paths "A," "B," and "C."

The predicted weighting factors were calculated according to the present invention. Each weighting factor included a path geometry term, a turbulence term and a relaxation term. Representative values are shown in the tables below:

Two-Path

Baseline Test Loop
Design "A"/IFC @ 3D

|  | Path "A" | Path "C" |
|---|---|---|
| Path Geometry | 0.8460 | 1.8245 |
| Relaxation | 0.1633 | −0.8671 |
| Turbulence | 0.0010 | 0.0010 |
| Predicted ("Yp") | 1.0103 | 0.9584 |
| Empirical ("Ym") @ 42 fps | 1.0105 | 0.9591 |
| Residual Error ("e") | −0.02% | −0.07% Mean = −0.05% |

Elbow + Tee Test Loop
Design "B"/IFC @ 1D

|  | Path "B" | Path "C" |
|---|---|---|
| Path Geometry | 0.8460 | 1.8245 |
| Relaxation | 0.1590 | −0.8450 |
| Turbulence | 0.0037 | 0.0037 |
| Predicted ("Yp") | 1.0087 | 0.9832 |
| Empirical ("Ym") @ 42 fps | 1.0089 | 0.9834 |
| Residual Error ("e") | −0.02% | −0.02% Mean = −0.02% |

Three-Path

Tee Test Loop
IFC @ 3D

|  | Path "A" | Path "B" | Path "C" |
|---|---|---|---|
| Path Geometry | 0.8460 | 0.8460 | 1.8245 |
| Relaxation | 0.1578 | 0.1582 | −0.8389 |
| Turbulence | 0.0010 | 0.0010 | 0.0010 |
| Predicted ("Yp") | 1.0048 | 1.0052 | 0.9866 |
| Empirical ("Ym") @ 14 fps | 1.0036 | 1.0063 | 0.9859 |
| Residual Error ("e") | 0.12% | −0.11% | 0.07% Mean = 0.03% |

Note in the above charts, the path turbulence terms are identical (0.0010 for tests with IFC @ 3D and 0.0037 for tests with IFC @ 1D). This is because the path turbulence term depends upon the distance of the path from the isolating flow conditioner. Also note that unlike the single-path chart, the relaxation terms vary. This is because the relaxation term depends upon the actual relaxation of the flow as determined by the relationship between differing path velocity measurements. It takes at least two different paths with differing path geometries to measure and calculate a relaxation term.

The experiments demonstrated the validity of the novel concept. The two-path device demonstrated a residual error of less than 0.25% with flow velocities greater than 5 feet per second. This means that the predicted weighting factors calculated according to the present invention produce measured flowrates that are within 0.25% of the actual flowrates in both perturbed and "laboratory" flow conditions. This performance exceeds the performance of all current integration-based ultrasonic flowmeters. Yet, this extraordinary performance is achieved using less than half of the transducers and chordal paths with a related savings in manufacturing and maintenance costs.

The three-path design performed even better and demonstrated a residual error of less than 0.2% with flow velocities greater than 5 feet per second.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method for measuring the flow of fluid in a channel, said method comprising the steps of:
    (a) eliminating flow swirl;
    (b) eliminating flow asymmetry;
    (c) measuring transit times of acoustic pulses along at least one chordal path within said non-swirling, axi-symmetric flow; and
    (d) converting said transit times to a measurement of flow velocity using at least one correction factor that includes a weighting factor based upon geometry of the chordal path and flow turbulence.

2. The method of claim 1 wherein said converting step includes using a correction factor that is a weighting factor based upon two or more chordal path and flow turbulence.

3. The method of claim 1 wherein said measuring step includes measuring transit times of acoustic pulses along at least two chordal paths and wherein said converting step includes using said correction factor that is a weighting factor based upon chordal path, flow turbulence, and flow relaxation.

4. The method of claim 2 or 3 wherein said converting step includes using a correction factor that additionally includes a calibration factor based upon empirical laboratory testing.

5. The method of claim 1 wherein said converting step includes using said correction factor that further includes a calibration factor based upon empirical laboratory testing.

6. A method for analyzing the performance of an ultrasonic flowmeter, said method comprising the steps of:
    (a) reducing flow swirl to less than two degrees;
    (b) reducing flow asymmetry to less than 5% difference in flow velocity between parallel chords on opposing sides of the flow axis;
    (c) measuring transit times of acoustic pulses along at least one chordal path within said non-swirling, axi-symmetric flow;
    (d) using said measured transit times for obtaining a measured flow parameter used to perform at least one self-diagnostic function.

7. The method of claim 6 wherein said step of using said measured transit times includes performing said self-diagnostic function to evaluate stability of a timing clock from the difference between a predicted velocity of sound based upon an equation of state and measured velocity of sound.

8. The method of claim 6 wherein said step of using said measured transit times includes performing said self-diagnostic function to evaluate acoustic path lengths from the difference between a predicted velocity of sound based upon an equation of state and measured velocity of sound.

9. The method of claim 6 wherein said step of using said measured transit times includes performing said self-diagnostic function to evaluate fluid variations from the difference between a predicted velocity of sound based upon an equation of state and measured velocity of sound.

10. The method of claim 6 wherein said step of using said measured transit times includes performing said self-diagnostic function to evaluate fluid variations based upon an analysis of distortion or strength of said acoustic pulse.

11. The method of claim 6 wherein said step of using said measured transit times includes performing said self-diagnostic function to evaluate particulate deposits on the channel's containment structure, an acoustic transducer's face, or an acoustic transducer's mounting pocket based upon an analysis of distortion or strength of said acoustic pulse.

12. The method of claim 6 wherein said measuring step includes using at least two chordal paths and said step of using said measured transit times includes performing said self-diagnostic function to evaluate stability of a timing clock from the difference between at least two chordal paths' velocity of sound measurements.

13. The method of claim 6 wherein said measuring step includes using at least two chordal paths and said step of using said measured transit times includes performing said self-diagnostic function to evaluate at least one mechanical path angle from the difference between at least two chordal paths' corrected velocities.

14. The method of claim 6 wherein said measuring step includes using at least two chordal paths of parallel geometry and said step of using said measured transit times includes performing said self-diagnostic function to evaluate at least one acoustic path's length from the difference between at least two chordal paths' raw velocities.

15. The method of claim 6 wherein said measuring step includes using at least two chordal paths and said step of using said measured transit times includes performing said self-diagnostic function to evaluate calibration parameter programming from the difference between at least two chordal paths' corrected velocities.

16. The method of claim 6 wherein said measuring step includes using at least two chordal paths and said step of using said measured transit times includes performing said self-diagnostic function to evaluate calibration parameter programming from the difference between at least two chordal paths' velocity of sound measurements.

17. The method of claim 6 wherein said measuring step includes using at least two chordal paths and said step of using said measured transit times includes performing said self-diagnostic function to evaluate integration accuracy from the difference between at least two chordal paths' corrected velocities.

18. The method of claim 6 wherein said measuring step includes using at least two chordal paths and said step of using said measured transit times includes performing said self-diagnostic function to evaluate electronics performance from the difference between at least two chordal paths' corrected velocities.

19. The method of claim 6 wherein said measuring step includes using at least two chordal paths and said step of using said measured transit times includes performing said self-diagnostic function to evaluate electronics performance from the difference between at least two chordal paths' velocity of sound measurements.

20. The method of claim 6 wherein said measuring step includes using at least two chordal paths and said step of using said measured transit times includes performing said self-diagnostic function to evaluate acoustic probe performance from the difference between at least two chordal paths' corrected velocities.

21. The method of claim 6 wherein said measuring step includes using at least two chordal paths and said step of using said measured transit times includes performing said self-diagnostic function to evaluate acoustic probe performance from the difference between at least two chordal paths' velocity of sound measurements.

22. The method of claim 6 wherein said measuring step includes using at least two chordal paths of parallel geometry and said step of using said measured transit times includes performing said self-diagnostic function to evaluate delta time delay stability from the difference between at least two chordal paths' raw velocities.

23. The method of claim 6 wherein said measuring step includes using at least two chordal paths and said step of using said measured transit times includes performing said self-diagnostic function to evaluate delta time delay stability from the difference between at least two chordal paths' corrected velocities.

24. The method of claim 6 wherein said measuring step includes using at least two chordal paths of parallel geometry and said step of using said measured transit times includes performing said self-diagnostic function to evaluate device signature from the difference between at least two chordal paths' raw velocities.

25. The method of claim 6 wherein said measuring step includes using at least two chordal paths and said step of using said measured transit times includes performing said self-diagnostic function to evaluate device signature from the difference between at least two chordal paths' corrected velocities.

26. The method of claim 6 wherein said measuring step includes using at least two chordal paths and said step of using said measured transit times includes performing said self-diagnostic function to evaluate fluid variations from the difference between at least two chordal paths' corrected velocities.

27. The method of claim 6 wherein said measuring step includes using at least two chordal paths of parallel geometry and said step of using said measured transit times includes performing said self-diagnostic function to evaluate particulate deposits on the channel's containment structure, an acoustic transducer's face, or an acoustic transducer's mounting pocket from the difference between at least two chordal paths' raw velocities.

28. The method of claim 6 wherein said measuring step includes using at least two chordal paths and said step of using said measured transit times includes performing said self-diagnostic function to evaluate particulate deposits on the channel's containment structure, an acoustic transducer's face, or an acoustic transducer's mounting pocket from the difference between at least two chordal paths' corrected velocities.

* * * * *